US012576414B2

(12) United States Patent
Herre et al.

(10) Patent No.: US 12,576,414 B2
(45) Date of Patent: Mar. 17, 2026

(54) ELECTRODE ARRANGEMENT FOR A ROTARY ATOMIZER AND ASSOCIATED OPERATING METHOD

(71) Applicant: Dürr Systems AG, Bietigheim-Bissingen (DE)

(72) Inventors: Frank Herre, Oberriexingen (DE); Georg M. Sommer, Ludwigsburg (DE); Rainer Melcher, Oberstenfeld (DE); Sandra Berndt, Ditzingen (DE); Patrick Häussermann, Korb (DE)

( * ) Notice: Subject to any disclaimer, the term of this patent is extended or adjusted under 35 U.S.C. 154(b) by 46 days.

(21) Appl. No.: 18/686,896

(22) PCT Filed: Sep. 1, 2022

(86) PCT No.: PCT/EP2022/074310

§ 371 (c)(1),
(2) Date: Feb. 27, 2024

(87) PCT Pub. No.: WO2023/036679

PCT Pub. Date: Mar. 16, 2023

(65) Prior Publication Data

US 2024/0390923 A1 Nov. 28, 2024

(30) Foreign Application Priority Data

Sep. 7, 2021 (DE) ..................... 10 2021 123 081.0

(51) Int. Cl.
*B05B 12/36* (2018.01)
*B05B 5/035* (2006.01)
(Continued)

(52) U.S. Cl.
CPC ............ *B05B 5/0533* (2013.01); *B05B 5/035* (2013.01); *B05B 12/36* (2018.02); *B05B 15/555* (2018.02)

(58) Field of Classification Search
CPC ....... B05B 5/0533; B05B 5/035; B05B 12/36; B05B 15/555; B05B 12/32; B05B 5/0407
See application file for complete search history.

(56) References Cited

U.S. PATENT DOCUMENTS

| | | | |
|---|---|---|---|
| 7,721,745 | B2 | 5/2010 | Baumann et al. |
| 2007/0089762 | A1 | 4/2007 | Baumann et al. |

(Continued)

FOREIGN PATENT DOCUMENTS

| | | | |
|---|---|---|---|
| DE | 102014006647 | A1 | 11/2015 |
| DE | 102019107847 | A1 | 10/2020 |

(Continued)

OTHER PUBLICATIONS

International Search Report and Written Opinion for PCT/EP2022/074310 mailed Nov. 24, 2022 (14 pages; with English translation).

*Primary Examiner* — Erin F Bergner
(74) *Attorney, Agent, or Firm* — Taft Stettinius & Hollister LLP; Thomas E. Bejin; John W. Carpenter

(57) ABSTRACT

The disclosure relates to an electrode arrangement for the electrostatic external charging of paint on a rotary atomizer, which has an atomizer housing with an end-face tu-bus which preferably extends coaxially with the rotation axis of the rotary atomizer towards a bell cup. The electrode arrangement has a mounting ring for mounting the electrode arrangement on the atomizer housing of the rotary atomizer, as well as at least one charging electrode for the electrostatic external charging of the paint sprayed off by the rotary atomizer, the at least one charging electrode preferably projecting from the electrode arrangement. The disclosure additionally provides a closed tube shield projecting from the end face of the mounting ring, which in the mounted state extends along the rotation axis of the rotary atomizer as far as the tube of the rotary atomizer in order to shield at
(Continued)

least part of the tube of the rotary atomizer on its outside from overspray.

13 Claims, 4 Drawing Sheets

(51) Int. Cl.
*B05B 5/053* (2006.01)
*B05B 15/555* (2018.01)

(56) References Cited

U.S. PATENT DOCUMENTS

| | | | | |
|---|---|---|---|---|
| 2008/0121740 | A1* | 5/2008 | Yamada | B05B 15/50 239/223 |
| 2012/0006916 | A1 | 1/2012 | Nolte et al. | |
| 2015/0128857 | A1 | 5/2015 | Yamada et al. | |
| 2017/0072421 | A1 | 3/2017 | Baumann et al. | |
| 2018/0221896 | A1* | 8/2018 | Yamada | B05B 5/0407 |
| 2021/0162434 | A1 | 6/2021 | Faure et al. | |
| 2022/0161290 | A1 | 5/2022 | Buck et al. | |
| 2022/0410189 | A1* | 12/2022 | Yamauchi | B05B 12/149 |

FOREIGN PATENT DOCUMENTS

| | | | |
|---|---|---|---|
| EP | 1671706 | B1 | 5/2009 |
| EP | 2859954 | B1 | 4/2015 |
| EP | 2408568 | B1 | 12/2016 |

* cited by examiner

ELECTRODE ARRANGEMENT FOR A ROTARY ATOMIZER AND ASSOCIATED OPERATING METHOD

CROSS-REFERENCE TO RELATED APPLICATIONS

This application is a national stage of, and claims priority to, Patent Cooperation Treaty Application No. PCT/EP2022/074310, filed on Sep. 1, 2022, which application claims priority to German Application No. DE 10 2021 123 081.0, filed on Sep. 7, 2021, which applications are hereby incorporated herein by reference in their entireties.

TECHNICAL FIELD OF THE DISCLOSURE

The disclosure relates to an electrode arrangement for electrostatic external charging of paint on a rotary atomizer. The disclosure further comprises a rotary atomizer equipped with an electrode arrangement according to the disclosure. Furthermore, the disclosure also comprises an associated operating method.

BACKGROUND

FIG. 1 shows a conventional rotary atomizer 1 which can be used, for example, for painting motor vehicle body components in a painting installation and for this purpose has a bell cup 2 which can be rotated about a rotation axis 3. The rotary atomizer 1 has an angled atomizer housing 4 which, at its end located on the left in the drawing, can be mounted on a mounting flange of a painting robot, as is known per se from the prior art. At its distal end, the rotary atomizer 1 has a rotationally symmetrical tube 5 which tapers towards the bell cup 2 along the rotation axis 3 of the bell cup 2. The applied paint is electrostatically charged in this case in order to increase the application efficiency and reduce the disturbing overspray. For this purpose, an electrode arrangement 6 with several finger-shaped charging electrodes 7 is used, which project outward at an angle from a mounting ring 8 and electrostatically charge the applied coating, as is known from the prior art. The mounting ring 8 is used for the exchangeable mounting of the electrode arrangement 6 on the rotary atomizer 1. For this purpose, the mounting ring 8 is placed on the tube 5 of the rotary atomizer 1 and then fixed on the rotary atomizer 1 in the position shown in the drawing. The mounting ring 8 leaves the tube 5 largely free. This has the effect that the overspray occurring during painting operation can be deposited on the tube 5 of the rotary atomizer 1. The tube 5 of the rotary atomizer must therefore be cleaned regularly to remove the adhering overspray. This cleaning of the tube 5 is time-consuming.

DETAILED DESCRIPTION

Figure 1:
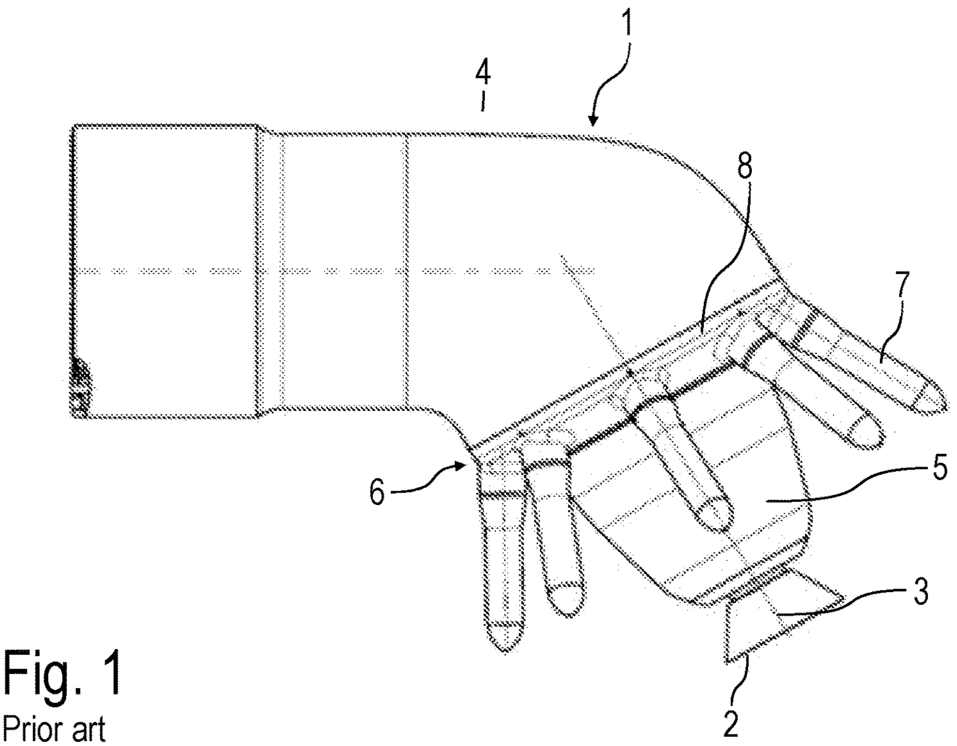
Fig. 1 Prior art
FIG. 1 shows a side view of a conventional rotary atomizer with a conventional electrode arrangement for external electrostatic charging.

The disclosure is based on the task of solving the problem of contamination of the tube of the rotary atomizer.

The electrode arrangement according to the disclosure is used for the electrostatic external charging of paint on a rotary atomizer which has an atomizer housing with a frontal tube which preferably extends coaxially with the rotation axis of the rotary atomizer towards a bell cup.

In accordance with the prior art, the electrode arrangement according to the disclosure also has a mounting ring which is used to mount the electrode arrangement according to the disclosure on the rotary atomizer. For this purpose, the mounting ring of the electrode arrangement is placed on the atomizer housing of the rotary atomizer, preferably on the tube of the rotary atomizer.

Also in the electrode arrangement according to the disclosure, at least one charging electrode is arranged which serves for the electrostatic external charging of the paint sprayed off by the rotary atomizer, the at least one charging electrode preferably projecting from the electrode arrangement, for example from the mounting ring. In a preferred embodiment, several finger-shaped charging electrodes are provided here, which are preferably arranged equidistantly distributed over the circumference of the mounting ring. For example, three, four, six or eight charging electrodes can be arranged distributed over the circumference.

The electrode arrangement according to the disclosure is now characterized by a tube shield which protrudes from the end face of the mounting ring and, in the mounted state, extends along the rotation axis of the rotary atomizer as far as the tube of the rotary atomizer in order to shield at least part of the tube of the rotary atomizer on its outside from overspray. Thus, the tube shield protects the covered portion of the tube from contamination by the overspray that occurs during operation, so that the covered portion of the tube does not need to be cleaned. Rather, it is sufficient to replace the electrode assembly contaminated by overspray with a clean electrode assembly.

In the preferred embodiment of the disclosure, the tube of the rotary atomizer has a distal cleaning area which, in an automated cleaning process using a cleaning device, is located within the cleaning device and can therefore be cleaned by the cleaning device. Furthermore, in the preferred embodiment, the tube of the rotary atomizer has a proximal residual area that is adjacent to the distal cleaning area, wherein the proximal residual area is outside of the cleaning device during a cleaning process with the cleaning device and therefore cannot be cleaned by the cleaning device. In the preferred embodiment, the tube shield covers the proximal residual area of the tube at least partially and preferably completely. Complete coverage of the proximal residual area of the tube is advantageous here because the proximal residual area cannot be cleaned in the cleaning device and should therefore be protected by the tube shield from contamination by overspray.

In the preferred embodiment of the disclosure, the tube shield has a seal at its distal end to seal an annular gap between the tube shield and the tube of the rotational atomizer. This is advantageous to prevent overspray from entering the annular gap between the tube shield and the tube of the rotary atomizer during operation, as this would lead to contamination of the tube in this area.

This sealing between the tube shield and the tube of the rotary atomizer is preferably achieved by means of a sealing ring, which can have a sealing lip at its distal end that rests on the outside of the tube. The sealing ring can, for example, be inserted in a circumferential groove in the end face of the tube shield.

The tube shield is preferably made of an electrically insulating material, such as polytetrafluoroethylene (PTFE).

In one variant of the disclosure, the tube shield is integrally molded to the mounting ring of the electrode assembly and is thus made of the same material as the mounting ring of the electrode assembly. In another variant of the disclosure, however, the tube shield is an independent component that is attached to the mounting ring of the electrode arrangement and optionally consists of a different material than the mounting ring.

In the preferred embodiment of the disclosure, the tube shield has an inner contour that is substantially complementary in shape to the outer contour of the tube of the rotary atomizer, so that the tube shield, when mounted, fits snugly against the tube or encloses an annular gap with the outer contour of the tube of the rotary atomizer. In the case of a conical outer contour of the tube of the rotary atomizer, the inner contour of the tube shield is thus preferably also conically-shaped.

The aforementioned annular circumferential annular gap between the outer circumferential surface of the tube of the rotary atomizer on the one hand and the inner surface of the tube shield on the other hand preferably has a gap width in the radial direction which is essentially constant over the entire axial length of the tube shield. This preferably means that the gap width measured in radial direction over the axial length of the tube shield has deviations of less than ±30%, ±20%, ±10% or ±5%.

It should also be mentioned that the annular gap between the outer contour of the tube of the rotary atomizer on the one hand and the surrounding tube shield on the other hand can be filled with an electrically insulating medium (e.g. petroleum jelly).

With regard to the tube shield, it should be mentioned in general that the tube shield is preferably substantially rotationally symmetrically shaped and can have a length of at least 3 cm, 5 cm, 7 cm, 9 cm, 11 cm or 13 cm in axial length along the rotation axis of the rotary atomizer, in order to protect as large as possible parts of the tube from contamination by overspray. Here, the tube shield preferably tapers in the distal direction, for example conically. In general, it should also be mentioned that the tube shield preferably surrounds the tube in a sleeve-like manner. With regard to the electrode arrangement, it should also be mentioned in general that this can preferably be interchangeably mounted on the rotary atomizer.

During operation, an electrical creepage path forms along the tube shield between the proximally arranged charging electrodes at high voltage potential on the one hand and the electrically grounded bell cup on the other. This creepage distance should be as long as possible without increasing the required length of the rotary atomizer. The outer surface of the tube shield therefore preferably has a creepage distance extension, which can consist in particular of a corrugation of the outer surface or of a labyrinth, in order to extend the electrical creepage distance between the charging electrode and the bell cup.

Furthermore, it should be mentioned that the disclosure does not only claim protection for the electrode arrangement according to the disclosure as described above. Rather, the disclosure also claims protection for a rotary atomizer equipped with such an electrode arrangement according to the disclosure.

Finally, the disclosure also claims protection for a cleaning method for cleaning such a rotary atomizer. Thus, the cleaning method according to the disclosure first provides that the rotary atomizer is inserted into a cleaning device through an insertion opening. Subsequently, the cleaning method according to the disclosure provides that the insertion opening is sealed by a seal. In the next step, it is then provided that the rotary atomizer is cleaned in the cleaning device, for example by spraying the rotary atomizer with a cleaning agent or a cleaning mixture and/or by brushing the rotary atomizer in the cleaning device.

Sealing of the insertion opening of the cleaning device after insertion of the rotary atomizer can be achieved, for example, by means of a sealing ring that rests on the outside of the tube shield of the electrode assembly of the rotary atomizer or on the sealing ring or sealing lip of the tube shield.

In one variant of the disclosure, this sealing ring of the cleaning device lies in axial direction over the sealing ring of the tube shield. As a result, the sealing ring of the cleaning device presses axially from the outside onto the tube shield and thus increases the radial contact pressure of the sealing ring of the tube shield.

In another variant of the disclosure, on the other hand, the sealing ring of the cleaning device is axially offset from the sealing ring of the tube shield in the sealed state, which is also possible.

The aforementioned sealing of the insertion opening of the tube ring can be achieved, for example, with a contacting seal (e.g. sealing ring) or with a non-contacting seal, such as a blast air ring.

Figure 2:
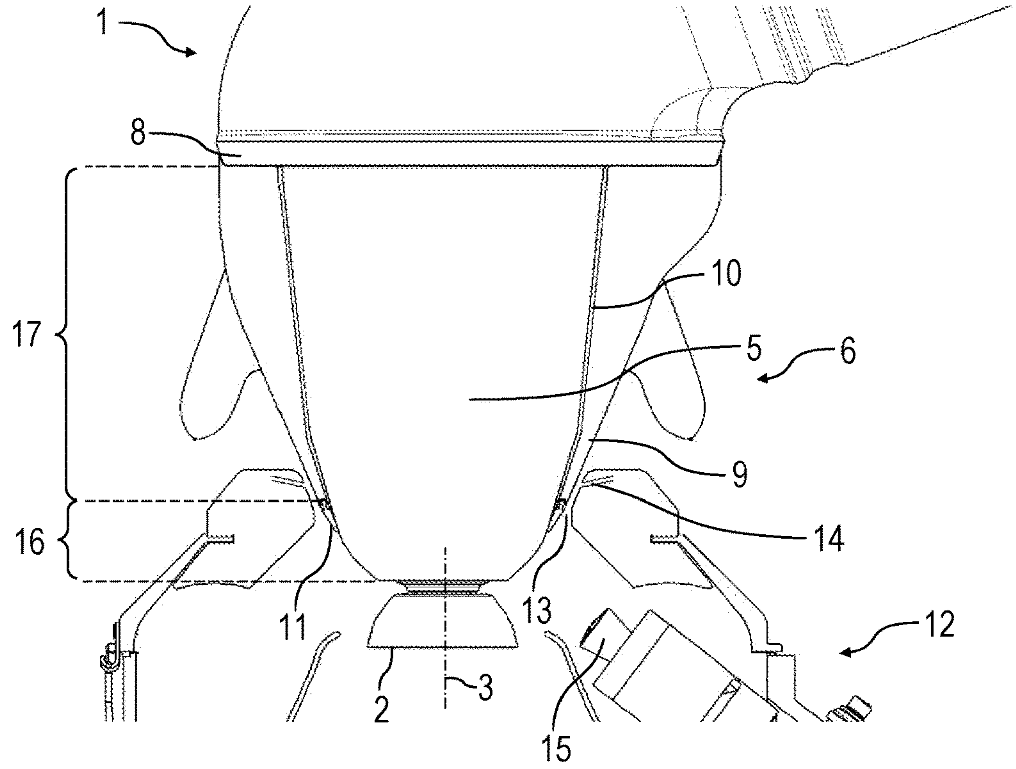
FIG. 2 shows a sectional view of a rotary atomizer according to the disclosure with an electrode arrangement according to the disclosure during a cleaning process in a cleaning device.

In the following, the embodiment according to the disclosure shown in FIG. 2 is described, which largely corresponds to the conventional rotary atomizer 1 described at the beginning, so that reference is made to the above description in order to avoid repetitions, whereby the same reference signs are used for corresponding details.

A feature of this embodiment is that a tube shield 9 is formed on the mounting ring 8 of the electrode arrangement 6, which projects distally from the mounting ring 8 of the electrode arrangement 6 and covers the tube 5 of the rotary atomizer 1, thereby protecting it from contamination by overspray.

It should be mentioned here that the inner contour of the tube shield 9 is complementarily adapted to the outer contour of the tube 5, so that the tube shield 9 encloses an annular gap 10 with the tube 5, which has a gap width that is substantially constant along the rotation axis 3 of the rotary cup 2. The annular gap 10 between the outer tube shield 9 and the inner tube 5 is filled with an insulating medium (e.g. petroleum jelly).

At its distal end, the sleeve-shaped tube shield 9 has a circumferential annular groove at the front, into which a sealing ring 11 is inserted, which rests with its distally projecting sealing lip on the outer surface of the tube 5 to form a seal.

The drawing shows the rotary atomizer 1 in a cleaning position within a cleaning device 12. The rotary atomizer 1 is inserted into an insertion opening 13 on the upper side of the cleaning device 12.

An annular gap is formed between the outer contour of the tube shield 9 and the peripheral edge of the insertion opening 13 of the cleaning device 12, which is sealed by a blast air ring 14.

In the cleaning device 12, there are cleaning nozzles 15 which serve to clean the tube 5 of the rotary atomizer 1 in a distal cleaning area 16 by spraying the tube 5 with a cleaning agent. In this case, the distal cleaning area 16 is located within the cleaning device 12 and can thus be cleaned in the cleaning device 12. Adjacent to the distal cleaning area 16 is a proximal residual area 17, which cannot be cleaned in the cleaning device 12 because it is outside the cleaning device 12 during the cleaning process. The division of the tube 5 into the cleaning area 16 and the residual area 17 is important with respect to the tube shield 9. Thus, the tube shield 9 completely covers the tube 5 of the rotary atomizer 1 within the proximal residual area 17. Within the proximal residual area 17, no cleaning of the tube 5 is therefore required, since the tube 5 is covered by the tube shield 9 in this area, so that it cannot be contaminated there by overspray. The distal cleaning area 16, on the other hand, does not need to be covered by the tube shield 9, as it can be easily cleaned inside the cleaning device 12.

Figure 3A:
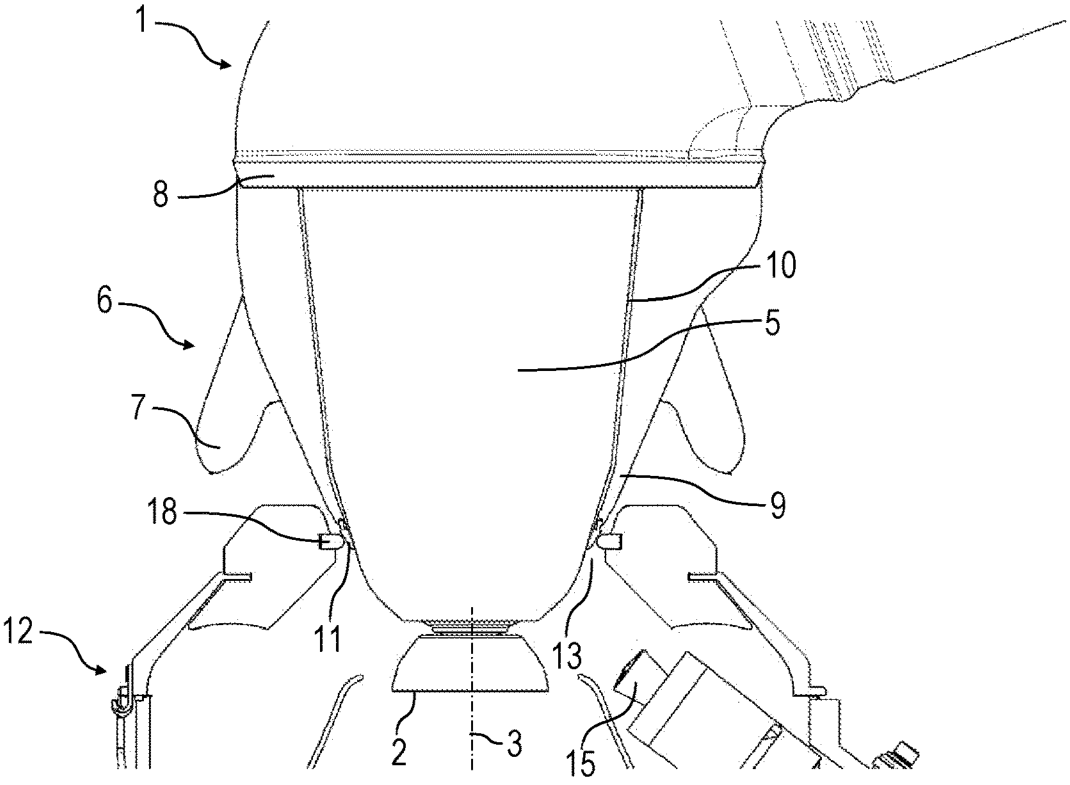
FIG. 3A shows a variation of FIG. 2.
Figure 3B:
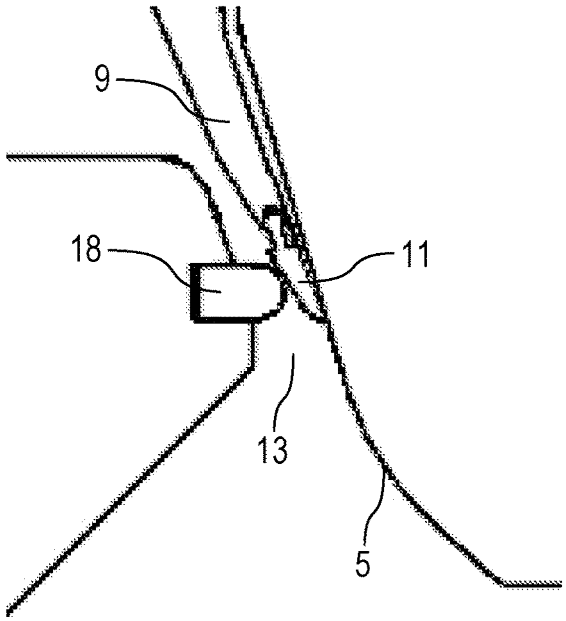
FIG. 3B shows an enlarged detailed view from FIG. 3A in the area of a sealing ring of the cleaning device.

FIGS. 3A and 3B show a modification of the embodiment according to FIG. 2, so that in order to avoid repetitions, reference is made to the above description, whereby the same reference signs are used for corresponding details.

A feature of this embodiment is that the sealing of the insertion opening 13 of the cleaning device 12 is not effected by the blast air ring 14 according to FIG. 2, but by a sealing ring 18, which rests in contact on the sealing ring 11 of the tube shield 9 and thereby presses the sealing lip of the sealing ring 11 radially against the outer surface of the tube 5.

Figure 4:
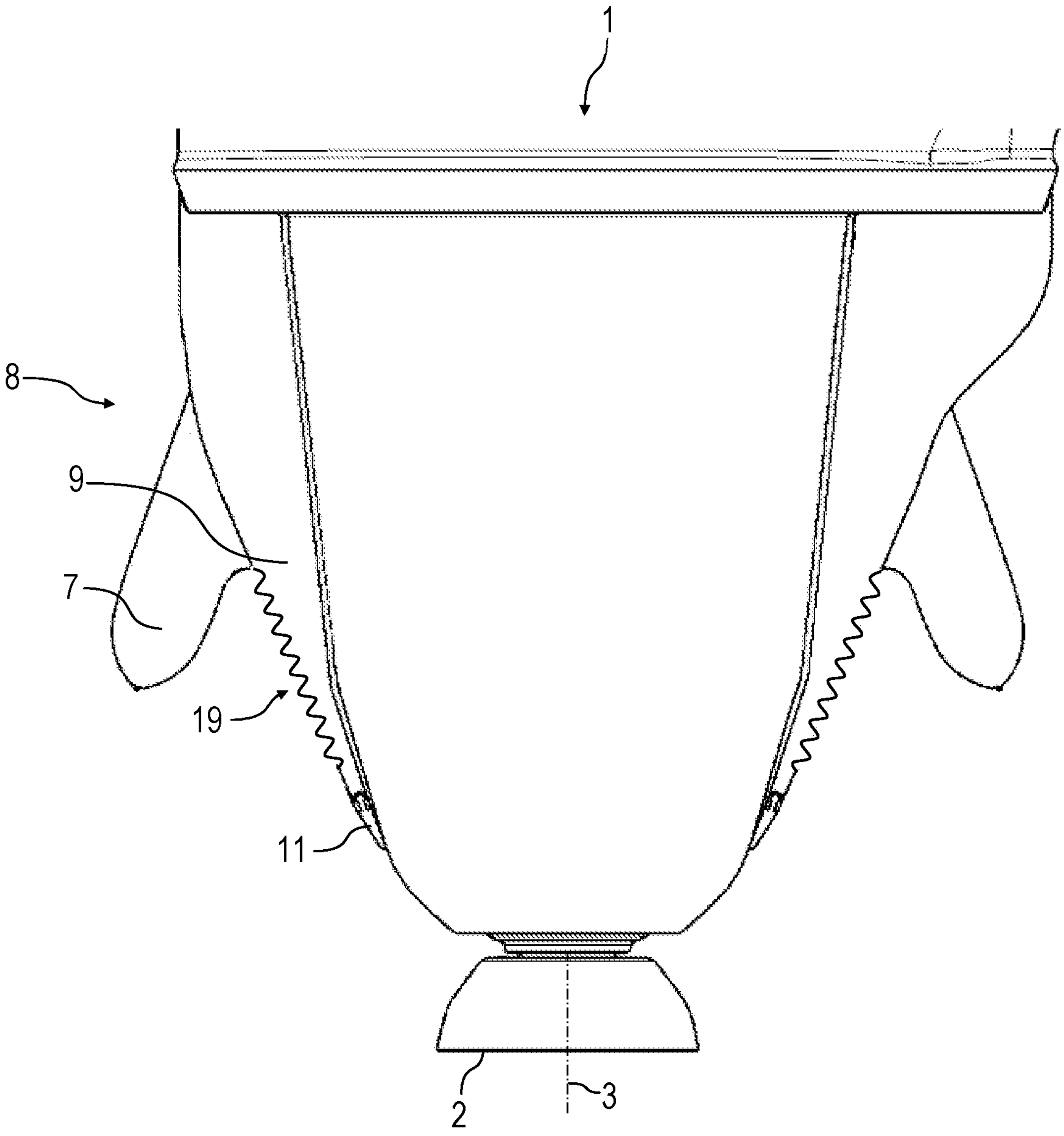
FIG. 4 shows a variation of FIGS. 2, 3A and 3B with a creepage distance extension.

FIG. 4 shows a further variation of the above-described embodiments according to FIGS. 2, 3A and 3B. Here, an additional wavy creepage distance extension 19 is shown schematically, which extends the electrical creepage distance between the charging electrodes 7 and the electrically grounded bell cup 2 along the outer surface of the tube 5. In the drawing, the creepage distance extension 19 is shown as a ripple. However, it is alternatively possible that the creepage distance extension 19 is formed as a labyrinth.

Figure 5:
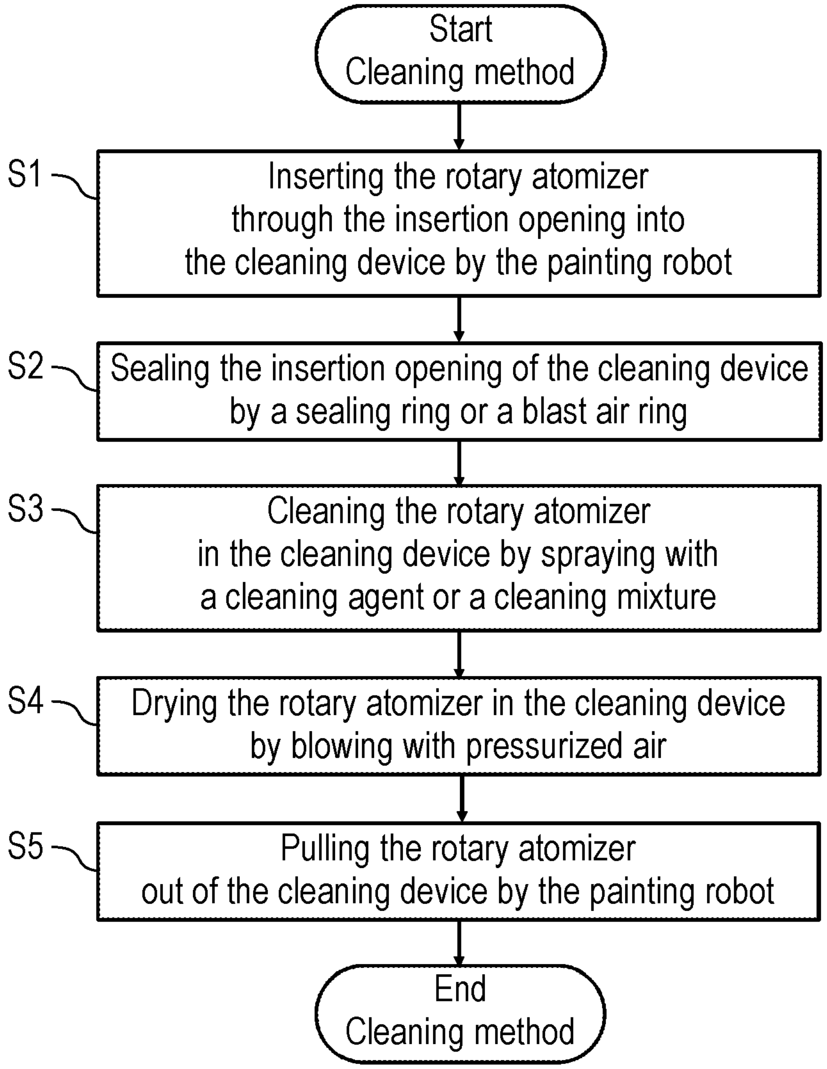
FIG. 5 shows a flow diagram to illustrate the cleaning method according to the disclosure.

FIG. 5 shows a flow diagram to illustrate the cleaning method according to the disclosure.

In a first step S1, the painting robot inserts the rotary atomizer 1 through the insertion opening 13 into the cleaning device 12.

In a second step S2, the insertion opening 13 of the cleaning device 12 is then sealed, optionally as shown in FIG. 2 by the blast air ring 14 or as shown in FIGS. 3A, 3B by the sealing ring 18.

In the next step S3, the rotary atomizer 1 is then cleaned in the cleaning device 12 by spraying it with cleaning agent or a cleaning mixture.

In a further step S4, the rotary atomizer 1 is then dried in the cleaning device 12, for example by blowing on it with compressed air.

In the last step S5, the rotary atomizer 1 is then pulled out of the cleaning device 12 again.

The disclosure is not limited to the preferred embodiments described above. Rather, the disclosure also encompasses a large number of variants and modifications which make use of the inventive idea and therefore fall within the scope of protection. In particular, the disclosure also claims protection for the subject-matter and the features of the dependent claims independently of the claims referenced in each case and in particular also without the features of the main claim. The disclosure thus comprises various aspects of the disclosure which enjoy protection independently of each other.

The invention claimed is:

1. An electrode arrangement adapted for the electrostatic external charging of paint on a rotary atomizer, including an atomizer housing with a tube on the end face, which extends coaxially with the rotation axis of the rotary atomizer towards a bell cup, having a) a mounting ring for mounting the electrode arrangement on the atomizer housing of the rotary atomizer, and b) at least one charging electrode for the electrostatic external charging of the paint sprayed by the rotary atomizer, c) further comprising a closed tube shield projecting from the end face of the mounting ring and extending, in the mounted state, along the rotation axis of the rotary atomizer as far as the tube of the rotary atomizer in order to shield at least part of the tube of the rotary atomizer on its outside from over-spray, and d) a sealing ring positioned in an annular groove at a distal end of the tube shield in order to seal an annular gap between the tube shield and the tube of the rotary atomizer.

2. The electrode arrangement according to claim 1, wherein the at least one charging electrode projects from the electrode arrangement.

3. The electrode arrangement according to claim 1, wherein a) the tube of the rotary atomizer has a distal cleaning area which, in an automated cleaning process with a cleaning device, lies within the cleaning device and can therefore be cleaned by the cleaning device, b) the tube of the rotary atomizer has a proximal residual area which lies outside the cleaning device during a cleaning process with a cleaning device and therefore cannot be cleaned by the cleaning device, and c) the tube shield covers the proximal residual area of the tube at least partially.

4. The electrode arrangement according to claim 3, wherein the tube shield covers the proximal residual area of the tube of the rotary atomizer completely.

5. The electrode arrangement according to claim 1, wherein the tube shield consists of an electrically insulating material.

6. The electrode arrangement according to claim 1, wherein the tube shield is integrally formed on the mounting ring of the electrode arrangement and consists of the same material as the mounting ring.

7. The electrode arrangement according to claim 1, wherein the tube shield is an independent component which is fastened to the mounting ring of the electrode arrangement and comprises a different material than the mounting ring.

8. The electrode arrangement according to claim 1, wherein the tube shield has an inner contour which is shaped essentially complementary to the outer contour of the tube of the rotary atomizer, so that, in the assembled state, the tube shield fits snugly against the tube or encloses an annular circumferential annular gap with the outer contour of the tube of the rotary atomizer.

9. The electrode arrangement according to claim 8, wherein the annularly circumferential annular gap between the outer contour of the tube of the rotary atomizer and the tube shield has a gap width which is essentially constant, so that the gap width of the annular gap over the axial length of the tube shield has deviations of less than ±30%.

10. The electrode arrangement according to claim 8, wherein the annular gap between the outer contour of the tube of the rotary atomizer and the tube shield is filled with an electrical insulating medium.

11. The electrode arrangement according to claim 1, wherein a) the tube shield is substantially rotationally symmetrically shaped, and b) the tube shield extends in axial direction along the rotation axis of the rotation atomizer over a length of at least 3 cm, and c) the tube shield tapers in the distal direction, and d) the tube shield is sleeve-shaped.

12. The electrode arrangement according to claim 1, wherein the electrode arrangement can be exchangeably mounted on the rotary atomizer.

13. The electrode arrangement according to claim 1, wherein a) the tube shield in the mounted state forms on its outer surface an electrical creepage distance between the charging electrode lying at high voltage potential and the grounded bell cup, and b) the outer surface of the tube shield has a creepage distance extension as a corrugation of the outer surface or as a labyrinth, in order to extend the creepage distance.

* * * * *